United States Patent [19]
Hosokawa et al.

[11] Patent Number: 5,549,177
[45] Date of Patent: Aug. 27, 1996

[54] SYSTEM FOR LUBRICATING AND COOLING MAIN SPINDLE HEAD OF MACHINE TOOL

[75] Inventors: Yutaka Hosokawa, Fuji; Haruzi Hosoi, Nagaizumi, both of Japan

[73] Assignee: Toshiba Kikai Kabushiki Kaisha, Japan

[21] Appl. No.: 439,378

[22] Filed: May 11, 1995

[30] Foreign Application Priority Data

May 11, 1994 [JP] Japan .................................. 6-097560

[51] Int. Cl.$^6$ ...................................................... F01M 5/00
[52] U.S. Cl. ...................... 184/6.22; 184/6.14; 184/104.1
[58] Field of Search ................................ 184/6.14, 6.22, 184/6, 6.12, 104.1

[56] References Cited

U.S. PATENT DOCUMENTS

| | | | |
|---|---|---|---|
| 1,334,844 | 3/1920 | Day | 184/6.22 |
| 2,524,043 | 10/1950 | Daugherty | 184/6.22 |
| 3,090,365 | 5/1963 | Constantino | 184/6.22 |
| 3,729,064 | 4/1973 | Wolf et al. | 184/6.14 |
| 4,511,016 | 4/1985 | Döell | 184/6.22 |

*Primary Examiner*—Thomas E. Denion
*Attorney, Agent, or Firm*—Cushman Darby & Cushman, LLP

[57] ABSTRACT

A system for lubricating and cooling the main spindle head of a machine tool includes a cooling device 12 having a pipe 64 at the outlet side thereof, which is bifurcated into two lines, i.e. a lubricating oil circuit and a cooling oil circuit. Simultaneously, Venturi tubes 38 are arranged in the pipe line at the return side of the cooling oil circuit, and the Venturi tubes 38 and the oil bath 18 of the lubricating oil circuit are connected by pipes 43 and 44.

6 Claims, 4 Drawing Sheets

SYSTEM FOR LUBRICATING AND COOLING MAIN SPINDLE HEAD OF MACHINE TOOL

FIELD OF THE INVENTION

This invention relates to a system for lubricating and cooling the main spindle head of a machine tool, which allows the lubrication and the temperature control of the main spindle head and the cooling of the main spindle to be performed in combination by constituting the system so as to recover the oil, which has finished lubricating the bearings and gears within the spindle head of the machine tool, into a cooling oil circuit of the main spindle.

BACKGROUND OF THE INVENTION

The temperature control of the main spindle and the proper lubrication of the bearings, gears and the like within the main spindle head are indispensable in order to maintain the machining precision of a machine tool at a high precision in a stable condition.

FIG. 3 shows a conventional cooling oil circuit for a main spindle in a machining center.

Referring to FIG. 3, reference character 10 indicates the main spindle of a machine tool, and reference character 11 indicates a main spindle motor which drives the main spindle 10 in rotation. A cooling device 12 includes a storage tank 13 for storing lubricating oil, and a pump 14 which sucks and delivers the lubricating oil in the tank 13. The lubricating oil delivered from the pump 14 is cooled as it passes through a cooler 63. FIG. 4 shows the composition of a cooling circuit in which lubricating oil is cooled by the cooler 63. In this cooling device 12, the delivery side of a compressor 60 is connected to a condenser 61, a capillary tube 62 and the cooler 63 in this order, so that a refrigerating cycle is constituted.

The lubricating oil sucked by the pump 14 is thus fed to the cooler 63, in which heat exchange is performed. This cooled oil is delivered from an oil outlet 65 of the cooling device 12 and flows through the cooling oil circuit, i.e., flows regularly to an oil groove 16 arranged on the periphery of the main spindle 10 of the machine tool and to an oil Groove 17 provided round the main spindle motor 11, thereby absorbing heat from these parts, so that a rise in temperature of the main spindle motor 11 can be prevented.

In the meantime, an oil bath 18 is provided in the interior of the main spindle head. A lubricating oil circuit is provided in which the oil which has gathered in the oil bath 18 is sucked through an oil filter 19 by an oil pump 20, and the oil which has been delivered from the oil pump 20 is fed through a manifold 21, and oil feeding tubes 30, 31 and 32 to each part which requires lubrication, i.e., to the bearings 33a, 33b and 33c, gears 34 and the like within the main spindle head. The lubricating oil which has finished lubricating is adapted to be recovered into the oil bath 18 again.

In this way, the conventional machine tool is of such construction that the cooling oil circuit for the main spindle and the lubricating oil circuit for the main spindle head are independently provided, and even when the oil which has performed the lubrication of the main spindle head is returned from the oil pan to the oil bath, it is not cooled. From this reason, notwithstanding that the main spindle is cooled, the interior of the main spindle head, in which the bearings and gears as the heat-generating places are incorporated, incurs a rise in temperature in proportion to time along with a lapse in the operating hours of the machine tool.

This generation of heat causes a temperature gradient from the main spindle head to the main spindle, and heat transfer occurs at each portion of the machine tool. Thus, there is a problem in that such heat transfer continues until the distribution of temperature at each portion of the machine tool becomes constant, so, the machining precision comes to be unstable during such a period of time. There is a further problem in that as the heated lubricating oil is returned to the oil pan, a rise in the air pressure within the main spindle head is brought about, causing the lubricating oil to blow off from the lower portion of the main spindle head.

SUMMARY OF THE INVENTION

An object of the invention is to provide a system for lubricating and cooling the main spindle head of a machine tool, which performs the control of temperature of the main spindle and the interior of the main spindle in combination, thereby allowing the heat transfer within the main spindle head to be made small.

Moreover, another object is to provide a system for lubricating and cooling the main spindle head of a machine tool which allows a rise in pressure within the main spindle head to be suppressed, thereby preventing the lubricating oil from blowing off from the lower portion of the main spindle head.

In order to achieve the above-described object, according to the present invention, there is provided a system for lubricating and cooling the main spindle head of a machine tool, which comprises:

a storage tank for oil;

a cooling device for cooling and delivering the cooling oil stored in said storage tank;

a lubricating oil circuit and a cooling oil circuit which are constituted by bifurcating a pipe at the outlet side of said cooling device into two lines;

said lubricating oil circuit serving to feed lubricating oil to the parts which require lubrication, within said main spindle head of said machine tool;

said cooling oil circuit serving to circulate oil for cooling said main spindle of said machine tool, so that it passes through said main spindle of said machine tool and returns to said storage tank;

an oil bath for recovering said lubricating oil fed from said lubricating oil circuit; and means for transferring said lubricating oil recovered in said oil bath to said storage tank.

Further, a system according to the present invention includes a three-way valve by way of which said lubricating oil circuit and said cooling oil circuit are connected to said pipe at the outlet side of said cooling device.

Moreover, a system according to the present invention includes a flow regulating means arranged at a downstream position of said three-way valve.

Preferably, said flow regulating means consists of a throttle valve.

Further, said means for transferring said lubricating oil from said oil bath to said storage tank consists of a Venturi tube, which is arranged in said cooling oil circuit after the oil passes through said main spindle of said machine tool and which has a suction port connected to said oil bath.

Preferably, a plurality of Venturi tubes are arranged in parallel to each other.

In the operation of the above-described system, each part within the main spindle head, such as the bearings, gears and the like is lubricated by the oil flowing through the lubricating oil circuit, while the main spindle is cooled by the oil circulating in the cooling oil circuit. The lubricating oil which has lubricated each part within the main spindle head is recovered in the oil bath, and the lubricating oil recovered in the oil bath is sucked by the lubricating oil-transferring means and is transferred to the storage tank of the cooling device. This makes it possible to cool the oil, which has lubricated the main spindle head and increased in temperature, by the cooling device and, thereafter, to recirculate the cooled oil; so, a rise in temperature within the main spindle head can be prevented, and the heat transfer from the main spindle head to the main spindle can be suppressed.

BRIEF DESCRIPTION OF THE DRAWINGS

Other objects and aspects of the invention will become apparent from the following description of embodiments with reference to the accompanying drawings in which.

DETAILED DESCRIPTION OF PREFERRED EMBODIMENT

Figure 1:
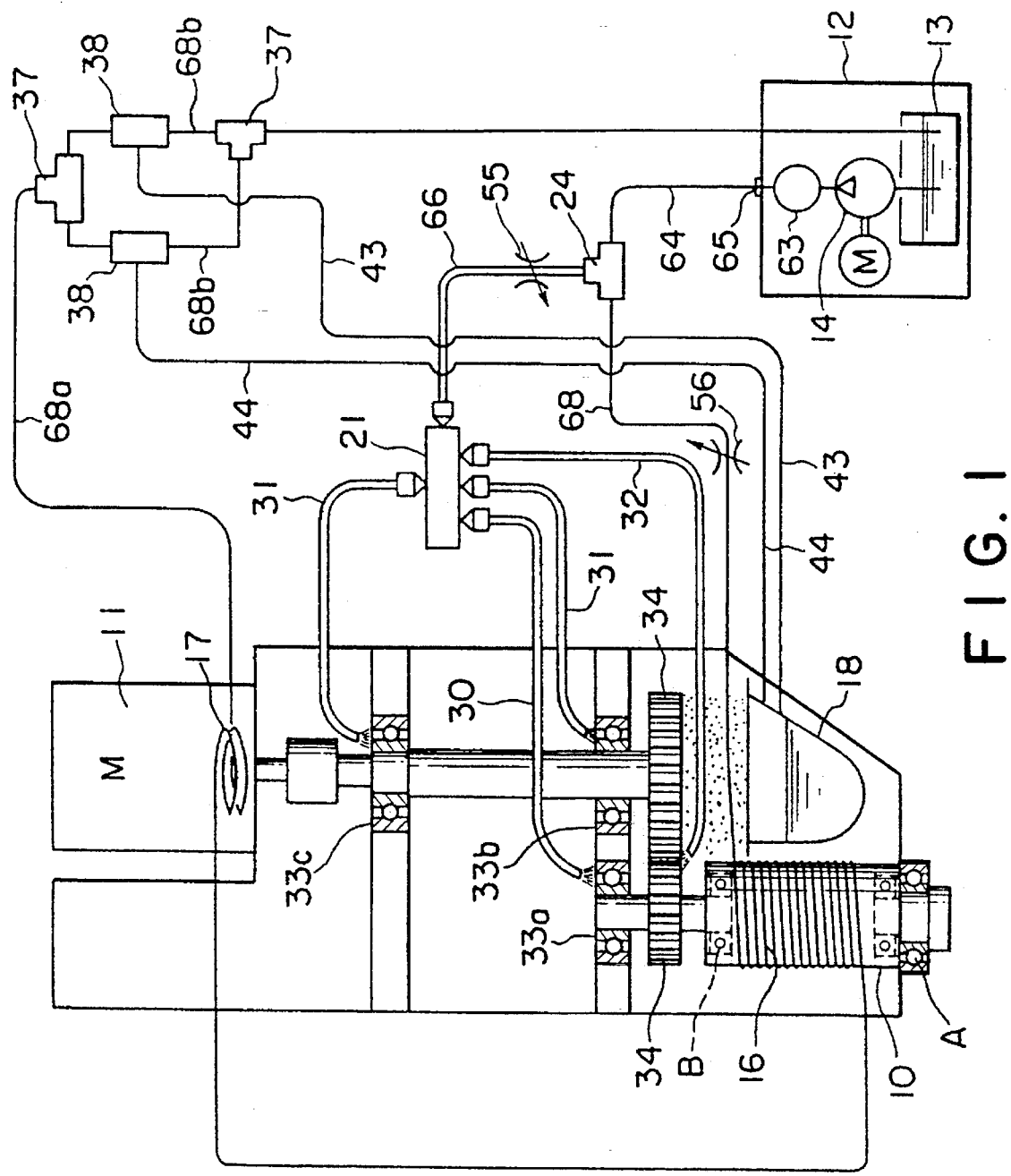
FIG. 1 is a systematic view of a pipe arrangement showing an embodiment of the present invention.

Now, one embodiment of a system for lubricating and cooling the main spindle head of a machine tool according to the present invention will be described with reference to the drawings, wherein the same components as those in the above-described conventional example are designated by the same reference characters.

FIG. 1 is a systematic view of a pipe arrangement showing an embodiment of the present invention. In the present embodiment, a three-way valve 24 is arranged in an outlet pipe 64 connected to the oil outlet 65 of a cooling device 12, and the outlet pipe 64 is bifurcated into two lines, i.e. a lubricating oil circuit 66 and a cooling oil circuit 68 by way of the three-way valve 24.

The lubricating oil circuit 66 further branches off into oil feeding pipes 30, 31 and 32 for feeding oil to each part which requires lubrication, such as bearings 33a, 33b and 33c and gears 34 within the main spindle head by way of a manifold 21. Moreover, the cooling oil circuit 68 is constituted so that it is connected to an oil groove 16 formed on the outer periphery of the main spindle 10 and, further, passes through an oil groove 17 of a main spindle motor 11 and is returned to a storage tank 13 of the cooling device 12 again.

Between the three-way valve 24 of the lubricating oil circuit 66 and the manifold 21 is arranged a flow regulating means, for example, a throttle valve 55. Further, also at the downstream position of the three-way valve 24 of the cooling oil circuit 68 is arranged a throttle valve 56. These throttle valves 55 and 56 serve to regulate the flow rate of the lubricating oil flowing through the lubricating oil circuit 66 and the cooling oil circuit 68, respectively. Preferably, such regulation of the flow rate of the oil is performed so that the lubricating oil flowing through the cooling oil circuit 68 is greater in quantity than the lubricating oil flowing through the lubricating oil circuit 66.

The lubricating oil fed from the lubricating oil circuit 66 is fed to each part which requires lubrication, such as the bearings 33a, 33b and 33c, gears 34 and the like and, thereafter, falls into the oil pan or the like disposed below said each part, further flowing into the oil bath 18 within the main spindle head for storage.

Figure 2:
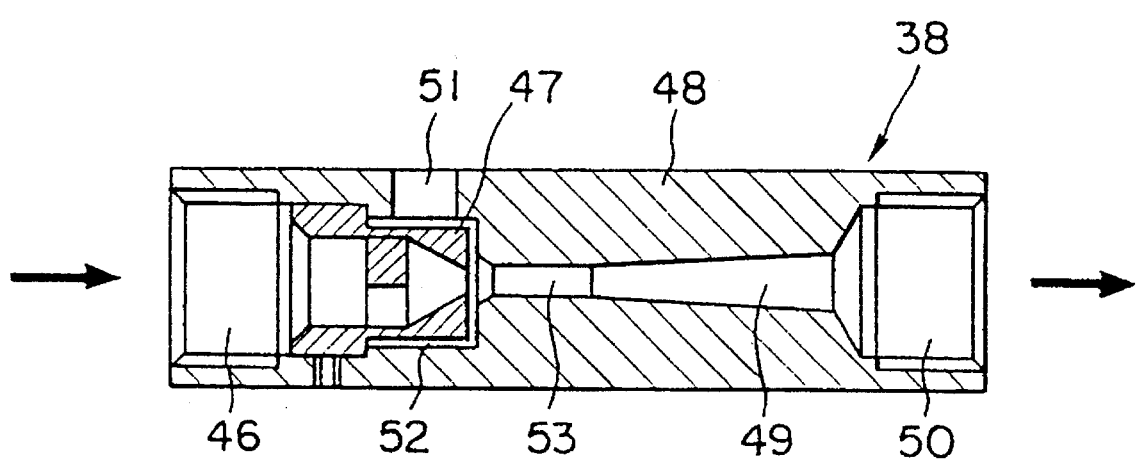
FIG. 2 is a longitudinal sectional view showing the construction of a Venturi tube.

Parallel circuits 68b are constituted using a three-way valve 37 in the return circuit 68a of the cooling oil circuit 68, and are provided with Venturi tubes 38, respectively. As an example is shown in FIG. 2, each Venturi tube 38 has an inlet 46 and an outlet 50 at both ends of the body 48 which communicate with each other, and is formed with an intermediate chamber 52, a throat part 53 and a diffuser 49 between the inlet 46 and the outlet 50. A nozzle 47 is fitted into the intermediate chamber 52, and the throat part 53 has the form of a narrow section of a throttled flow path. Moreover, the diffuser 49 has the form of enlarging in diameter toward the outlet 50. In addition, a suction port 51 is formed at the lateral part of the body 48 and communicates with the throat part 53 by way of the intermediate chamber 52.

To the inlet 46 and the outlet 50 of the Venturi tube 38 are connected the parallel circuits 68b of the cooling oil circuit 68, respectively, and to the suction port 51 are connected pipes 43 and 44 which are connected to the oil bath 18.

In the operation of the present embodiment as constituted above, the lubricating oil, which has been sucked from the storage tank 13 by the pump 14 of the cooling device 12, is cooled as it passes through the cooler 63 and, thereafter, is delivered from the delivery port 65. The lubricating oil, which has flowed into the lubricating oil circuit 66 by way of the three-way valve 24, further branches off at the manifold 21, and is fed to the places which require lubrication, such as the bearings 33a, 33b and 33c, the gears 34 and the like within the main spindle head. These lubricating oils, which have branched off and performed the lubricating function, fall and gather in the oil bath 18 within the main spindle head.

In the meantime, the lubricating oil, which has flowed into the cooling oil circuit 68 by way of the three-way valve 24, is fed to the respective oil grooves 16 and 17 of the main spindle 10 and the main spindle motor 11 and, after cooling them, is returned to the storage tank 13 of the cooling device 12 by way of the return circuit 68a. When the lubricating oil flows through the return circuit 68a, it passes through the Venturi tubes 38 and, as the action of the Venturi tubes 38 produces negative pressure in the suction ports 51, the oil in the oil bath 18 is sucked into the Venturi tubes 38 passing through the pipes 43 and 44 connected to the suction ports 51. Such sucked lubricating oil is returned to the storage tank 13 of the cooling device 12 by way of the return circuit 68a of the cooling oil circuit 68.

In this way, according to the present embodiment, not only the lubricating oil flowing through the cooling oil circuit 68 but also the lubricating oil flowing through the lubricating oil circuit 66 are sucked from the oil bath 18, returned to the storage tank 13 of the cooling device 12, cooled passing through the cooler 63 and, thereafter, circulated again.

Accordingly, the temperature control of the lubricating oil, which lubricates each part within the main spindle head, can surely be performed so that the temperature within the main spindle head can be stabilized. This suppresses the heat transfer of the main spindle 10, thereby enabling an improvement in the machining precision.

Moreover, since the flow rate of the lubricating oil flowing to the cooling oil circuit 68 is regulated using the throttle valves 55 and 56 to thereby keep in balance the force of suction by means of the Venturi tubes 38 and the quantity of the lubricating oil stored in the oil bath 18, excess of a predetermined quantity of lubricating oil is never stored in the oil bath 18; so, the lubricating oil in the lubricating oil circuit 66 can be surely circulated. This prevents the lubricating oil from blowing off from the lower portion of the main spindle head, even if the temperature of the lubricating oil rises, causing the air pressure within the main spindle head to increase.

In addition, the air pressure in the oil bath 18 within the main spindle head becomes more than a normal pressure under the influence of revolution of the gears and bearings because the oil bath is usually sealed; however, since air is also recovered simultaneously with the lubricating oil by the sucking action of the Venturi tubes 38, a rise in the air pressure within the main spindle head is prevented, thereby also preventing the lubricating oil from blowing off.

Figure 3:
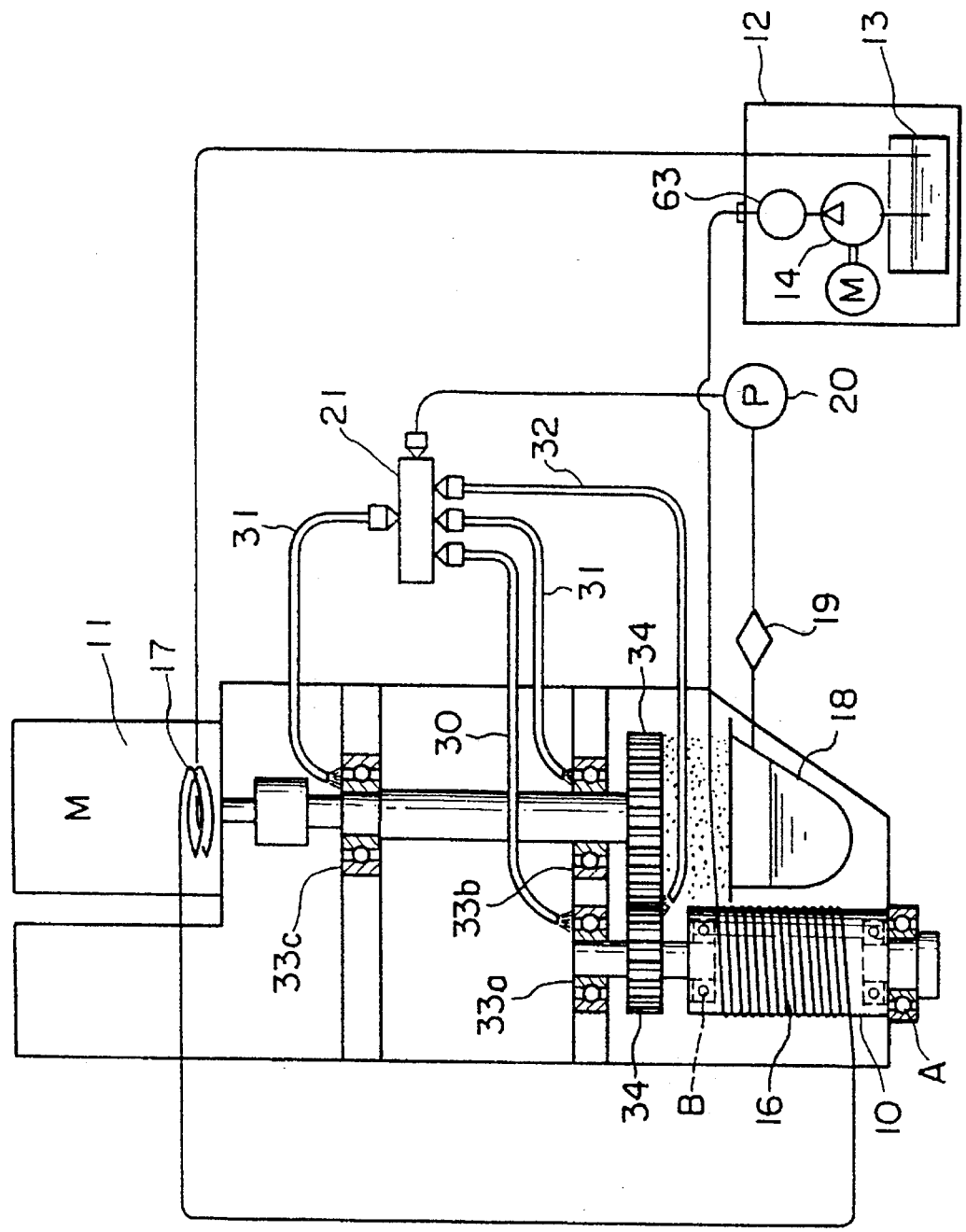
FIG. 3 is a systematic view of a pipe arrangement showing a cooling circuit and a lubricating circuit for a main spindle in the prior art.
Figure 4:
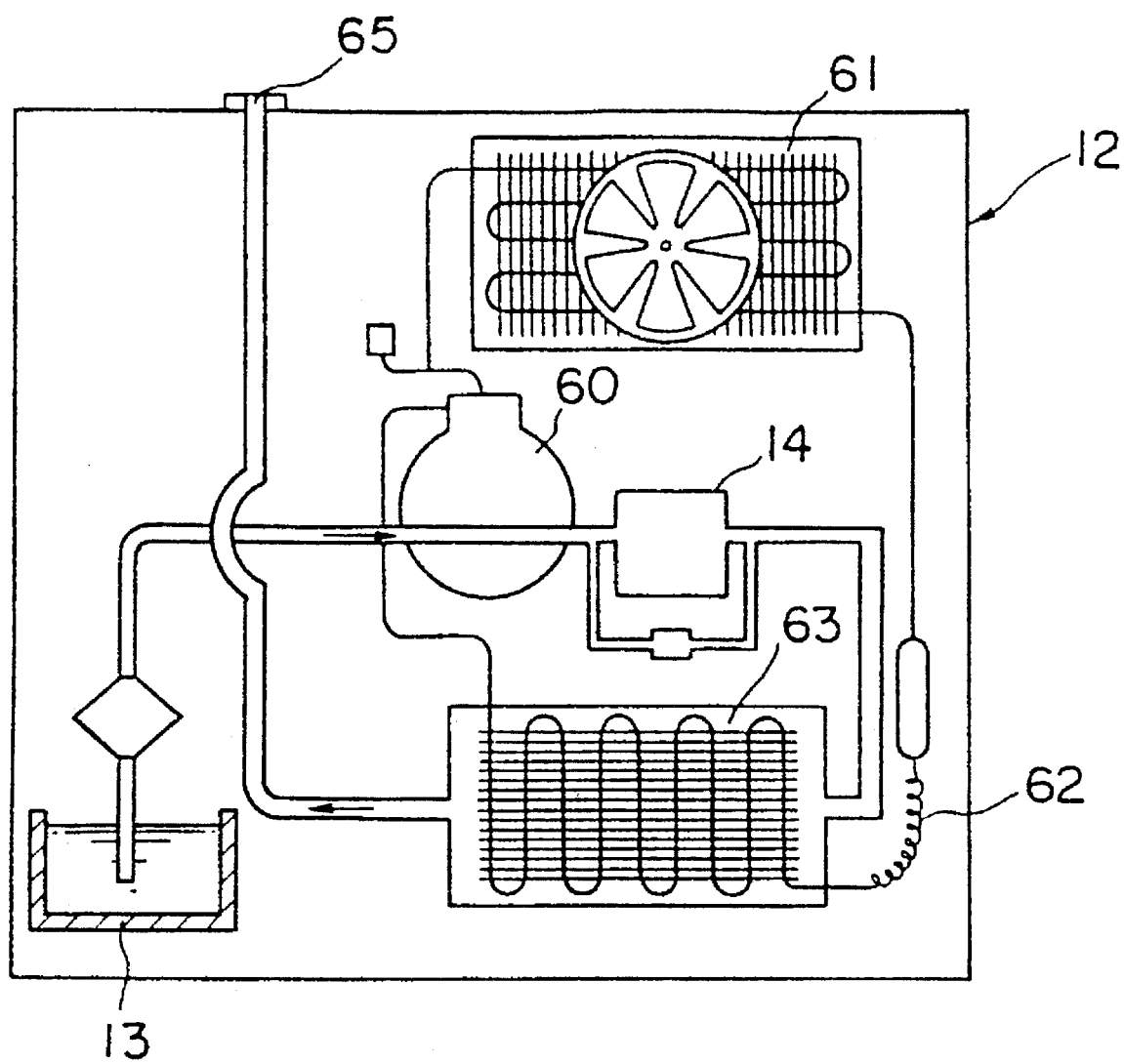
FIG. 4 is a systematic view showing an embodiment of a cooling device.

Tables 1 and 2 show the result of the measurement of temperature performed to confirm the effects of the present embodiment, Table 1 showing the case of application of the present embodiment and Table 2 showing an example of the prior art. Namely, the main spindles of machine tools were continuously operated for five and more hours at ten thousand revolutions per minute, and changes in temperature at each place within the main spindle heads were measured and compared. As is apparent from these tables, a rise in temperature of each part, i.e., the upper main spindle bearing B (refer to FIGS. 1 and 3), main spindle support bearing 33a, lower motor shaft support bearing 33b and upper motor shaft support bearing 33c, which produce the greatest rise in temperature, is suppressed to a smaller value in the main spindle head to which the present embodiment is applied, as compared with that in the prior art to which the present embodiment is not applied.

In the present embodiment, an example in which Venturi tubes 38 are used as means for transferring the lubricating oil from the oil bath 18 to the storage tank 13 is shown; however, any suction means other than the Venturi tubes, for example, an oil pump may be used to transfer the lubricating oil.

Further, an example in which two Venturi tubes are used in parallel is shown, however, such number can suitably be increased or decreased corresponding to the amount of the lubricating oil recovered from the oil bath 18.

Moreover, the cooling oil circuit 68 is provided as a circuit in which the lubricating oil flows to the main spindle motor 11 by way of the main spindle 10, however, it may be a circuit in which the lubricating oil flows separately in parallel to the main spindle 10 and the main spindle motor 11.

As described above, since according to the present invention the pipe at an outlet side of the cooling device is bifurcated into two lines, i.e., the above-described lubricating oil circuit and cooling oil circuit and, simultaneously, the oil bath of the lubricating oil circuit and the storage tank of the cooling device are connected by way of a lubricating oil transferring means, the oil which has flowed through the lubricating oil circuit of the main spindle head can be recovered into the storage tank of the cooling device and cooled therein. This allows the temperature control of the main spindle and the main spindle head to be performed in combination, in addition to the lubrication of the main spindle head; so, the heat transfer within the main spindle head can be suppressed to thereby achieve a stabilization of the machining precision.

In addition, since an amount of lubricating oil stored in the oil bath is reduced and the air within the oil bath is sucked together with the lubricating oil, no lubricating oil blows off from the lower portion of the main spindle head even if heat expansion of the lubricating oil and air within the oil bath occurs.

TABLE 1

| Place | Hour | | | | | | Difference in temperature |
|---|---|---|---|---|---|---|---|
| | 0 | 1 hour | 2 hours | 3 hours | 4 hours | 5 hours | |
| Lower main spindle bearing A | 19 | 23.4 | 28 | 29.2 | 30.6 | 31.4 | 12.4 |
| Upper main spindle bearing B | 19 | 25 | 30.6 | 31 | 32 | 33 | 14 |
| Main spindle support bearing 33a | 22 | 38 | 39.4 | 40 | 42 | 43.6 | 21.6 |
| Lower motor shaft support bearing 33b | 21 | 29 | 31 | 32 | 34 | 34.4 | 13.4 |
| Upper motor shaft support bearing 33c | 19 | 24 | 27.6 | 29.2 | 31.4 | 32 | 13 |
| Room temperature | 18 | 18 | 18 | 19 | 21.4 | 22 | 4 |
| Oil temperature in tank | 18 | 24 | 26 | 27 | 28.2 | 29.2 | 11.2 |

Unit: °C.

TABLE 2

| Place | Hour | | | | | | Difference in temperature |
|---|---|---|---|---|---|---|---|
| | 0 | 1 hour | 2 hours | 3 hours | 4 hours | 5 hours | |
| Lower main spindle bearing A | 19 | 27 | 28 | 29.9 | 30 | 30 | 11 |
| Upper main spindle bearing B | 19 | 35 | 36.4 | 37.8 | 38 | 38 | 19 |
| Main spindle support bearing 33a | 19 | 50.4 | 50 | 50.6 | 51.2 | 51.8 | 32.8 |
| Lower motor shaft support | 19 | 47.2 | 49.5 | 50.6 | 51.2 | 51.8 | 32.8 |

TABLE 2-continued

| Place | Hour | | | | | | Difference in temperature |
|---|---|---|---|---|---|---|---|
| | 0 | 1 hour | 2 hours | 3 hours | 4 hours | 5 hours | |
| bearing 33b | | | | | | | |
| Upper motor shaft support bearing 33c | 19 | 27.5 | 29.5 | 31 | 31.8 | 31.8 | 12.8 |
| Room temperature | 18 | 19 | 19.8 | 21.4 | 22 | 22.2 | 4.2 |
| Oil temperature in tank | 18 | 26 | 26.4 | 28 | 28.2 | 29.2 | 11.2 |

Unit: °C.

What is claimed:

1. A system for lubricating and cooling a main spindle head of a machine tool, which comprises:

a storage tank for oil;

a cooling device for cooling and delivering oil stored in said storage tank;

a lubricating oil circuit and a cooling oil circuit which are constituted by bifurcating a pipe at an outlet side of said cooling device into two lines;

said lubricating oil circuit serving to feed lubricating oil to parts which require lubrication, within said main spindle head of said machine tool;

said cooling oil circuit functioning to circulate oil for cooling said main spindle of said machine tool, so that it passes through said main spindle of said machine tool and returns to said storage tank;

an oil bath for recovering said lubricating oil fed from said lubricating oil circuit; and means for transferring said lubricating oil recovered in said oil bath to said storage tank.

2. A system for lubricating and cooling a main spindle head as claimed in claim 1, further including a three-way valve by way of which said lubricating oil circuit and said cooling oil circuit are connected to said pipe at the outlet side of said cooling device.

3. A system for lubricating and cooling a main spindle head as claimed in claim 2, further including a flow regulating means arranged at a downstream position of said three-way valve.

4. A system for lubricating and cooling a main spindle head as claimed in claim 3, wherein said flow regulating means consists of a throttle valve.

5. A system for lubricating and cooling a main spindle head as claimed in claim 1, wherein said means for transferring said lubricating oil from said oil bath to said storage tank consists of a Venturi tube, which is arranged in said cooling oil circuit after the oil passes through said main spindle head of said machine tool and which has a suction port connected to said oil bath.

6. A system for lubricating and cooling a main spindle head as claimed in claim 5, wherein a plurality of Venturi tubes are arranged in parallel to each other.

* * * * *